(12) United States Patent
Wendt

(10) Patent No.: US 11,225,301 B2
(45) Date of Patent: Jan. 18, 2022

(54) PROVIDING MOVEMENT ASSISTANCE TO ELECTRIC CYCLE ON INCLINED STRUCTURES

(71) Applicant: Honda Motor Co., Ltd., Tokyo (JP)

(72) Inventor: Peter Wendt, Redondo Beach, CA (US)

(73) Assignee: Honda Motor Co., Ltd., Tokyo (JP)

( * ) Notice: Subject to any disclaimer, the term of this patent is extended or adjusted under 35 U.S.C. 154(b) by 244 days.

(21) Appl. No.: 16/719,696

(22) Filed: Dec. 18, 2019

(65) Prior Publication Data

US 2021/0188395 A1 Jun. 24, 2021

(51) Int. Cl.
- *B62M 6/50* (2010.01)
- *B60L 15/20* (2006.01)
- *B62M 19/00* (2006.01)

(52) U.S. Cl.
CPC ............. *B62M 6/50* (2013.01); *B60L 15/20* (2013.01); *B62M 19/00* (2013.01); *B60L 2200/12* (2013.01); *B60L 2240/10* (2013.01)

(58) Field of Classification Search
CPC .. B60L 2200/12; B60L 2240/10; B60L 15/20; B62M 19/00; B62M 6/50
See application file for complete search history.

(56) References Cited

U.S. PATENT DOCUMENTS

| | | | |
|---|---|---|---|
| 5,450,915 A | 9/1995 | Li | |
| 6,553,271 B1 | 4/2003 | Morrell | |
| 10,232,736 B2 * | 3/2019 | Hamann | B60L 50/20 |
| 11,008,063 B2 * | 5/2021 | Moening | B62M 6/50 |
| 2011/0160945 A1 * | 6/2011 | Gale | B60L 15/20 701/22 |
| 2013/0179016 A1 * | 7/2013 | Gale | B62K 11/00 701/22 |
| 2016/0304157 A1 * | 10/2016 | Craven | B60L 53/00 |
| 2016/0347407 A1 * | 12/2016 | Tsuchizawa | B60L 50/20 |
| 2017/0057595 A1 * | 3/2017 | Peng | B62M 6/90 |
| 2017/0151999 A1 * | 6/2017 | Kin | B62M 6/50 |
| 2017/0341705 A1 * | 11/2017 | Tsuchizawa | B62M 6/00 |
| 2018/0290709 A1 * | 10/2018 | Tsuchizawa | B62M 6/50 |

(Continued)

FOREIGN PATENT DOCUMENTS

| | | |
|---|---|---|
| CN | 100445159 C | 12/2008 |
| CN | 203111429 U | 8/2013 |

(Continued)

*Primary Examiner* — Luis A Martinez Borrero
(74) *Attorney, Agent, or Firm* — American Honda Motor Co., Inc.; Aaron Fong

(57) ABSTRACT

A system for providing a movement assistance to an electric cycle is provided. The system includes circuitry communicatively coupled to an electronically-actuated driving mechanism and a sensor system of the electric cycle. The circuitry receives sensor information associated with the electric cycle through the sensor system and determines an inclination of the electric cycle with respect to an inclination-reference based on the received sensor information. The circuitry further determines occupancy information associated with a seat of the electric cycle based on the received sensor information. Based on the determined inclination and the determined occupancy information, the circuitry controls the electronically-actuated driving mechanism to drive at least one wheel of the electric cycle.

18 Claims, 4 Drawing Sheets

(56) References Cited

U.S. PATENT DOCUMENTS

| | | | | |
|---|---|---|---|---|
| 2019/0031284 A1* | 1/2019 | Fuchs | ................... | B62M 19/00 |
| 2019/0250619 A1* | 8/2019 | Gillett | ................... | H04W 76/14 |
| 2019/0299797 A1* | 10/2019 | Hasumi | ................... | B60L 50/20 |
| 2019/0300115 A1* | 10/2019 | Shahana | ................... | B62M 6/55 |
| 2019/0308512 A1* | 10/2019 | Hasumi | ................... | B62M 6/45 |
| 2019/0315432 A1* | 10/2019 | Bockman | ............... | B62K 25/00 |
| 2019/0315433 A1* | 10/2019 | Hasumi | ................... | B60L 50/20 |
| 2019/0329840 A1* | 10/2019 | Jager | ................... | B62J 45/4152 |
| 2019/0358483 A1* | 11/2019 | Fuchs | ................ | A63B 24/0006 |
| 2019/0389535 A1* | 12/2019 | Moening | ................... | B62J 99/00 |
| 2021/0031848 A1* | 2/2021 | Du | ................... | G06Q 30/0645 |
| 2021/0078660 A1* | 3/2021 | Honda | ................... | B62J 45/20 |
| 2021/0114687 A1* | 4/2021 | Chang | ................... | B62J 45/412 |

FOREIGN PATENT DOCUMENTS

| | | | | | |
|---|---|---|---|---|---|
| CN | 203581294 | U | | 5/2014 | |
| CN | 203681768 | U | | 7/2014 | |
| CN | 204222535 | U | | 3/2015 | |
| CN | 204323614 | U | | 5/2015 | |
| DE | 102010018138 | A1 | * | 10/2011 | ............. B60L 50/20 |
| DE | 112019003302 | T5 | * | 3/2021 | ............. F16D 48/06 |
| EP | 0798201 | A2 | | 10/1997 | |
| WO | 2016078619 | A1 | | 5/2016 | |
| WO | 2018123160 | A1 | | 7/2018 | |

\* cited by examiner

PROVIDING MOVEMENT ASSISTANCE TO ELECTRIC CYCLE ON INCLINED STRUCTURES

BACKGROUND

Electric cycles, also referred to as e-bikes, are a popular means for short distance travel and for micro-mobility applications. Many users, especially ones who may not have a parking space near their apartments or a garage for their apartments, typically prefer to lift up and carry their e-bikes upstairs. However, lugging e-bikes up to two stories or even more may be tiring for an average user and may create unnecessary risks and hassles.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An exemplary aspect of the disclosure provides a system for providing a movement assistance to an electric cycle on an inclined structure. The system may include circuitry communicatively coupled to an electronically-actuated driving mechanism and a sensor system of the electric cycle. The circuitry may be configured to receive sensor information associated with the electric cycle through the sensor system and determine an inclination of the electric cycle with respect to an inclination-reference based on the received sensor information. The circuitry may be further configured to determine occupancy information associated with a seat of the electric cycle based on the received sensor information and control, based on the determined inclination and the determined occupancy information, the electronically-actuated driving mechanism to drive at least one wheel of the electric cycle.

Another exemplary aspect of the disclosure provides an electric cycle. The electric cycle may include an electronically-actuated driving mechanism, a sensor system, and circuitry communicatively coupled to the electronically-actuated driving mechanism and the sensor system. The circuitry may be configured to receive sensor information associated with the electric cycle through the sensor system and determine an inclination of the electric cycle with respect to an inclination-reference based on the received sensor information. The circuitry may be further configured to determine occupancy information associated with a seat of the electric cycle based on the received sensor information and control, based on the determined inclination and the determined occupancy information, the electronically-actuated driving mechanism to drive at least one wheel of the electric cycle.

Another exemplary aspect of the disclosure provides a method for providing movement assistance to an electric cycle on an inclined structure. The method may include receiving sensor information associated with an electric cycle through a sensor system of the electric cycle. The method may further include determining an inclination of the electric cycle with respect to an inclination-reference based on the received sensor information and determining occupancy information associated with a seat of the electric cycle based on the received sensor information. The method may further include controlling, based on the determined inclination and the determined occupancy information, an electronically-actuated driving mechanism of the electric cycle to drive at least one wheel of the electric cycle.

This summary is provided to introduce a selection of concepts in a simplified form that are further disclosed in the detailed description of the present disclosure. This summary is not intended to identify key or essential inventive concepts of the claimed subject matter, nor is it intended for determining the scope of the claimed subject matter.

Figure 1:
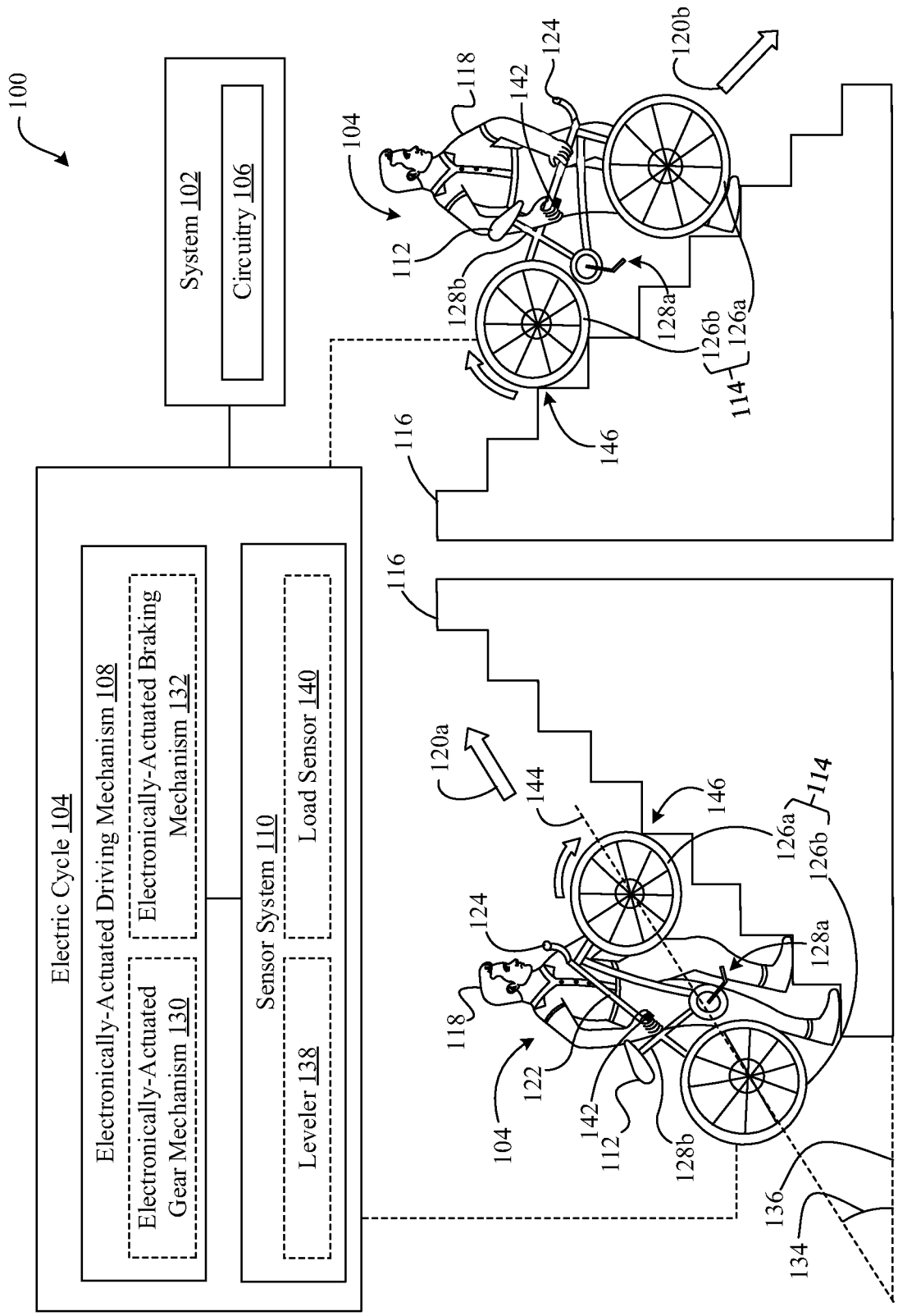
FIG. 1 is a diagram that illustrates an exemplary environment for providing a movement assistance to an electric cycle on an inclined structure, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in a disclosed system for providing a movement assistance to an electric cycle on an inclined structure (such as a staircase). Exemplary aspects of the disclosure may provide a system which may include circuitry communicatively coupled to an electronically actuated driving mechanism and a sensor system of the electric cycle. The system may automatically assist a user to push up the electric cycle up or down on the inclined structure. The circuitry may receive sensor information from the sensor system and may determine an inclination of the electric cycle and occupancy information associated with a seat of the electric cycle. For example, if the circuitry determines that the electric cycle is inclined at a certain inclination angle, then the circuitry may additionally check if, based on the occupancy information, the seat is vacant or not. If the seat is determined to be vacant and the inclination is above a threshold angle, the circuitry may determine that the user may be moving the electric cycle up or down on the inclined structure, such as a staircase. The circuitry may control the electronically-actuated driving mechanism to drive wheel(s) of the electric cycle on the inclined structure. Users typically have to lift up and carry the electric cycle upstairs or downstairs by two or more stories. Therefore, as the electronically-actuated driving mechanism may be controlled to drive the wheel(s) of the electric cycle, the user's effort may be reduced in pushing the electric cycle 104 up or down on the inclined structure.

In some embodiments, the present disclosure may also provide an input device, which when pressed, may allow the user to manually control the actuation of the electronically-actuated driving mechanism and the speed of the electric cycle on the inclined structure. The input device may be installed on the electric cycle at a suitable mounting position, from where the user may most likely hold the electric cycle. This may allow the user to actuate the input device while simultaneously holding onto the frame or the handlebar of the electric cycle.

Reference will now be made in detail to specific aspects or features, examples of which are illustrated in the accompanying drawings. Wherever possible, corresponding or similar reference numbers will be used throughout the drawings to refer to the same or corresponding parts.

FIG. 1 is a diagram that illustrates an exemplary environment for providing a movement assistance to an electric cycle on an inclined structure, in accordance with an embodiment of the disclosure. With reference to FIG. 1, there is shown an exemplary environment 100 that may include a system 102 and an electric cycle 104. The system 102 may include circuitry 106 which may be configured to aid in movement of the electric cycle 104. The electric cycle 104 may include an electronically-actuated driving mechanism 108 to control a movement of the electric cycle 104, a sensor system 110 to acquire sensor information associated with the electric cycle 104, a seat 112, and one or more wheels 114 to facilitate the movement of the electric cycle 104. The circuitry 106 may be communicatively coupled to the electronically-actuated driving mechanism 108 and the sensor system 110 of the electric cycle 104 so as to control the movement of the one or more wheels 114 of the electric cycle 104.

In the exemplary environment 100, there is shown an inclined structure 116 (e.g., shown as a staircase) and a user 118 who may be required to lift up the electric cycle 104 and move it upwards on the inclined structure 116 along a first direction 120a or downwards on the inclined structure 116 along a second direction 120b. Although, in FIG. 1, a staircase is shown as an example of the inclined structure 116. However, the present disclosure may be also applicable to other examples of the inclined structure 116, such as, but not limited to, a ramp or a sloped/uneven terrain.

The system 102 may include suitable logic, and interfaces that may be configured to control movement of the electric cycle 104 on the inclined structure 116 based on the sensor information acquired via the sensor system 110. For example, the system 102 may control the electronically-actuated driving mechanism 108 to drive the one or more wheels 114 of the electric cycle 104 upwards or downwards on the inclined structure 116.

Figure 3:
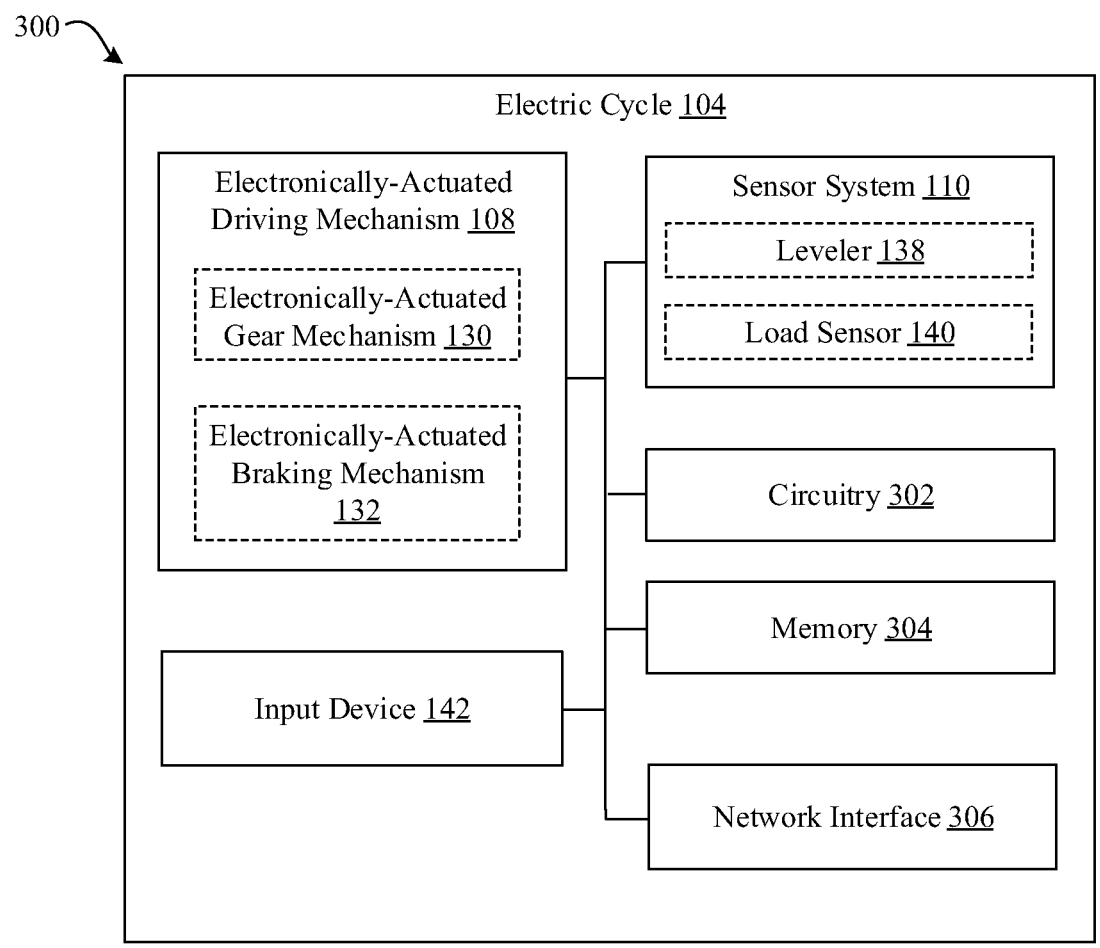
FIG. 3 is a block diagram of the exemplary electric cycle of FIG. 1, in accordance with an embodiment of the disclosure.

In an embodiment, the system 102 may be implemented as a modular electronic device (i.e. based on a modular design approach). With a modular design, the system may be configured to be removably mounted or removably installed on the electric cycle 104 and may be communicatively coupled to the electronically-actuated driving mechanism 108 and the sensor system 110 of the electric cycle 104. Alternatively, in another embodiment, the system 102 may be integrally embedded in a component of the electric cycle 104. For example, the system 102 may be implemented on an electronic chip, which may be configured to be embedded in one of the electronically-actuated driving mechanism 108, the sensor system 110, or other electronic circuits of the electric cycle 104. Alternatively, in another embodiment, the system 102 may be implemented as a wireless electronic device (such as a smartphone, a smartwatch, or other portable electronic devices). In such an implementation, the system 102 may be configured to be remotely connected to the electronically-actuated driving mechanism 108 and the sensor system 110 via a network interface (as shown in FIG. 3) of the electric cycle 104. Examples of other implementations of the system 102 may include, but are not limited to, a portable consumer electronic device or a computer on-board the electric cycle 104.

Figure 2:
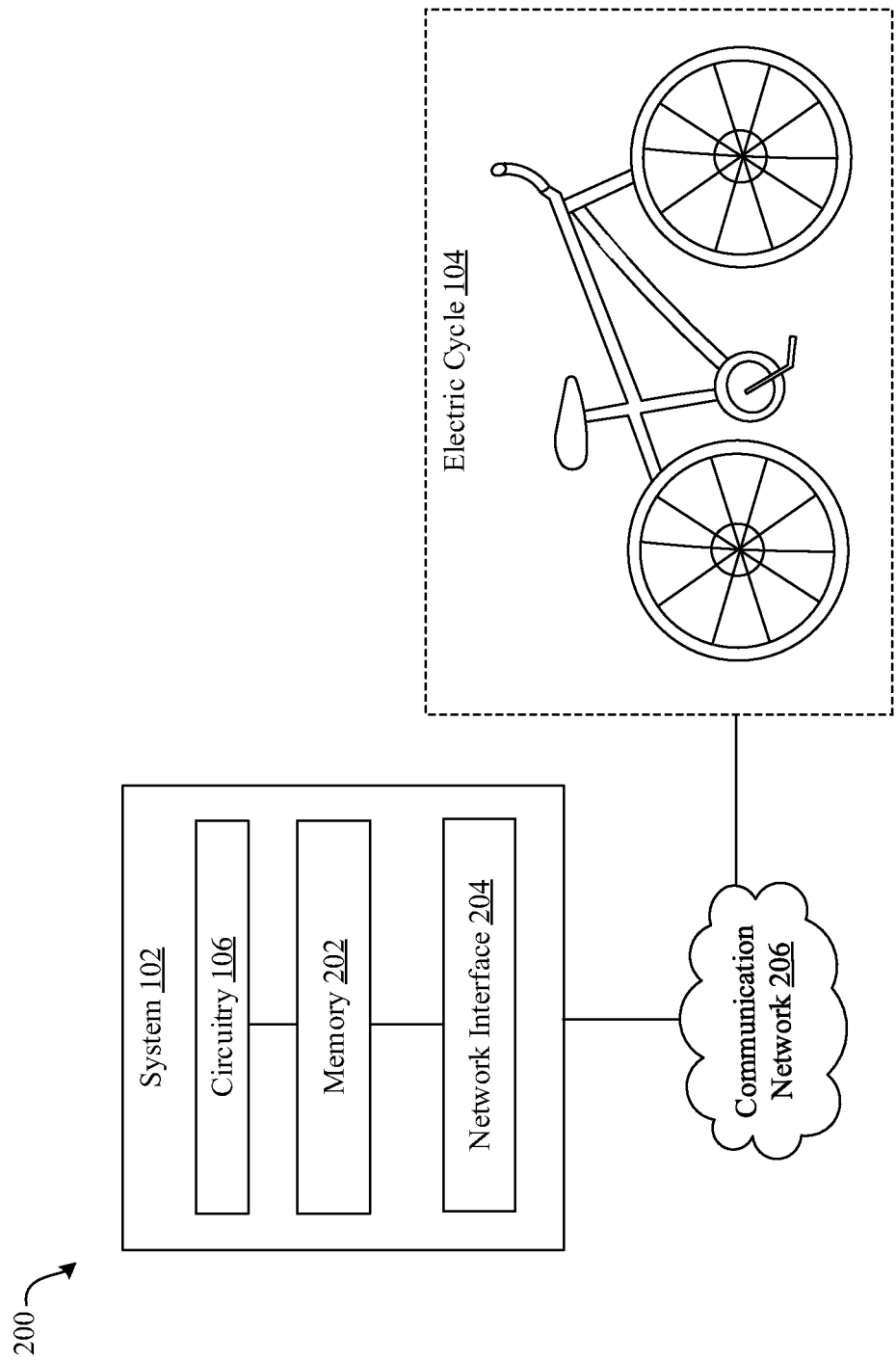
FIG. 2 is a block diagram of the exemplary system of FIG. 1, in accordance with an embodiment of the disclosure.

The electric cycle 104 may be a bicycle that may include the electronically-actuated driving mechanism 108 to control a movement of the electric cycle 104. The electric cycle 104 may also include a frame 122, a handlebar 124, a front wheel 126a, a rear wheel 126b, a pedal assembly 128a coupled to one of the front wheel 126a or the rear wheel 126b, the seat 112, and a support member 128b coupled to the frame 122 and configured to support the seat 112 on the frame 122. The electric cycle 104 may further include a power management system (as shown in FIG. 2) and a rechargeable battery (or a rechargeable battery pack). The power management system may be configured to control charging of the rechargeable battery and delivery of power from the rechargeable battery to different components, such as, but not limited to, the system 102, the electronically-actuated driving mechanism 108, or the sensor system 110 of the electric cycle 104.

The electric cycle 104 may belong to one of many classes of the electric cycle 104. For example, the electric cycle 104 may be one of a pedal-assist class, a power-on-demand class, or a hybrid of the pedal-assist class and the power-on-demand class. A person of ordinary skilled in the art will understand that the electric cycle 104 may also include other suitable components or systems, in addition to the components or systems illustrated herein. The description of other suitable components of the electric cycle 104 has been omitted from the disclosure for the sake of brevity. Also, FIG. 1 illustrates a specific design of the electric cycle 104; however, the disclosure may not be so limiting and in some embodiments, the electric cycle 104 may be of any suitable size or design with suitable structural features, without limiting the scope of the disclosure.

The circuitry 106 may include suitable logic, and interfaces that may be configured to execute program instructions associated with different operations to be executed by the system 102. The circuitry 106 may include one or more specialized processing units, which may be implemented as an integrated processor or a cluster of processors that perform the functions of the one or more specialized processing units, collectively. The circuitry 106 may be implemented based on a number of processor technologies known in the art. Examples of the implementations of the circuitry 106 may be an x86-based processor, a Reduced Instruction Set Computing (RISC) processor, an Application-Specific Integrated Circuit (ASIC) processor, a Complex Instruction Set Computing (CISC) processor, a microcontroller, a Central Processing Unit (CPU), a Graphics Processing Unit (GPU), and/or a combination thereof.

The electronically-actuated driving mechanism 108 may include suitable circuitries, logic, and interfaces that may be configured to drive the one or more wheels 114 (i.e. the front wheel 126a or the rear wheel 126b) of the electric cycle 104 on the inclined structure 116. For example, the electronically-actuated driving mechanism 108 may include an integrated electric motor (not shown), a motor driving circuit (not shown), and a power controller (not shown) for the integrated electric motor. By way of example, and not limitation, the electronically-actuated driving mechanism 108 may include a direct drive electric motor (not shown) or a geared electric motor (not shown) that may be configured to drive at least one of the front wheel 126a or the rear wheel 126b of the electric cycle 104. While the direct drive electric motor may work on a single speed driving mechanism, the geared electric motor may work on a multi-speed driving mechanism. In some embodiments, the electronically-actuated driving mechanism 108 may include an electronically-actuated gear mechanism 130 and/or an electronically-actuated braking mechanism 132, as shown. Alternatively, the electronically-actuated driving mechanism 108 may include a gear mechanism and a braking mechanism which may be controlled manually by the user 118.

The sensor system 110 may include suitable logic, circuitry, and interfaces that may be configured to acquire the sensor information associated with the electric cycle 104 and share the acquired sensor information with the circuitry 106. The sensor information may include real-time or near real-time measurements of parameters, such as an inclination 134 of the electric cycle 104 with respect to an inclination-reference 136 or occupancy information associated with the seat 112 of the electric cycle 104. In an embodiment, the sensor system 110 may include one or more sensors that collectively acquire the sensor information associated with the electric cycle 104. By way of example, and not limitation, the sensor system 110 may include a leveler 138 and a load sensor 140. The sensor system 110 may also include other sensors, description of which has been omitted from the disclosure for the sake of brevity.

The leveler 138 may be configured to acquire inclination information associated with the electric cycle 104. The inclination information may include measurements of the inclination 134 of the electric cycle 104 with respect to the inclination-reference 136. The leveler 138 may be mounted on the frame 122 of the electric cycle 104 and may have a suitable structure, which may allow the leveler 138 to be coupled to the frame 122. Examples of the leveler 138 may include, but are not limited to, a digital level device, a digital angle protractor, a digital inclinometer or a clinometer, a digital protractor, or a digital angle with a spirit level meter. In at least one embodiment, the leveler 138 may be implemented as a camera mounted on the frame 122 of the electric cycle 104. The camera may include an imaging unit, a gyroscope, and an accelerometer. Data from the imaging unit, the gyroscope, and the accelerometer may be processed to compute the inclination 134 of the electric cycle 104 with respect to the inclination-reference 136. The circuitry 106 may be configured to receive the acquired inclination information as part of the sensor information associated with the electric cycle 104.

The load sensor 140 may be configured to acquire the occupancy information associated with the electric cycle 104. The occupancy information may indicate whether the seat 112 is vacant or occupied by the user 118. For example, the occupancy information may include binary data, where a "0" may indicate that the seat 112 is vacant or unoccupied and a "1" may indicate that the seat 112 is occupied. The load sensor 140 may be configured to be attached to the seat 112 of the electric cycle 104 and may have a suitable structure which may allow the load sensor 140 to be coupled to the seat 112.

The load sensor 140 may be implemented based on a piezoelectric transducer that may be configured to measure a load applied on the seat 112 as a voltage signal. The occupancy information may be acquired based on the voltage signal. Examples of other implementations of the load sensor 140 may include, but are not limited to, a strain gauge-based load cell (e.g., a contact-based or a non-contact based strain gauge, or a foil strain gauge), a proximity sensor mounted on the seat 112, or a pneumatic load cell. The circuitry 106 may be configured to receive the acquired occupancy information as part of the sensor information.

In at least one embodiment, the electric cycle 104 may further include an input device 142, which may be coupled to the frame 122 of the electric cycle 104 and communicatively coupled to the circuitry 106. The input device 142 may be provided on the electric cycle 104 so that the user 118 may trigger the movement of the rear wheel 126b (or the front wheel 126a) while the user 118 lifts up and carries the electric cycle 104 upwards or downwards on the inclined structure 116. The circuitry 106 may receive a trigger input through the input device 142. Based on the received trigger input, the circuitry 106 may control the electronically-actuated driving mechanism 108 to drive the one or more wheels 114 of the electric cycle 104.

In FIG. 1, the input device 142 is shown to be coupled to the frame 122 at a position where the user 118 may most likely hold the electric cycle 104. The user 118 may be able to press a button on the input device 142 while still holding onto the frame 122 of the electric cycle 104. However, the disclosure may not be so limiting and in at least one embodiment, the input device 142 may be coupled to other suitable positions on the electric cycle 104. For example, the input device 142 may be coupled to the handlebar 124 so that the user 118 may easily press the button on the input device 142 while standing/walking next to the electric cycle 104 on the inclined structure 116 and holding onto the handlebar 124 of the electric cycle 104. Alternatively, in at least one embodiment, the input device 142 may be a handsfree device, such as user's smartphone, user's smartwatch, or a smart device installed in vicinity of the inclined structure 116. In such an implementation, the user 118 may be able to provide a handsfree input, such as a voice input, via the input device 142.

In operation, the sensor system 110 may acquire the sensor information associated with the electric cycle 104 and may share the acquired sensor information with the circuitry 106. The circuitry 106 may receive the sensor information associated with the electric cycle 104. By way of example, and not limitation, While the leveler 138 may acquire the inclination information, the load sensor 140 may acquire the occupancy information associated with the electric cycle 104. The circuitry 106 may receive the acquired inclination information and the acquired occupancy information as two parts of the sensor information associated with the electric cycle 104.

Based on the received sensor information, the circuitry 106 may determine the inclination 134 of the electric cycle 104 with respect to the inclination-reference 136. For example, for the inclination-reference 136, the leveler 138 may be pre-calibrated with a value of a reference inclination angle of a reference plane. By way of example, and not limitation, the circuitry 106 may determine the inclination 134 of the electric cycle 104 from the acquired inclination information. The determined inclination 134 may correspond to an angle ($\theta$) between the inclination-reference 136 and one of the front wheel 126a or the rear wheel 126b of the electric cycle 104. In such instances, the leveler 138 may be placed on an axle of the front wheel 126a or the rear wheel 126b of the electric cycle 104. As shown, for example, the inclination 134 is represented as an angle between the inclination-reference 136 and a line 144 that passes through a center of the front wheel 126a and/or the rear wheel 126b of the electric cycle 104.

The circuitry 106 may determine occupancy information associated with the seat 112 of the electric cycle 104 based on the received sensor information. At any time-instant, the occupancy information may indicate whether the seat 112 is vacant or not. Thereafter, based on the determined inclination and the determined occupancy information, the circuitry 106 may control the electronically-actuated driving mechanism 108 to drive the one or more wheels 114 of the electric cycle 104. The control of the electronically-actuated driving mechanism 108 may correspond to a control of a speed of rotation of the one or more wheels 114 (i.e. the front wheel 126a or the rear wheel 126b) on the inclined structure 116.

By way of example, and not limitation, the electronically-actuated driving mechanism 108 may be controlled based on a determination that the determined occupancy information indicates that the seat 112 is vacant. In some instances, the electronically-actuated driving mechanism 108 may be controlled further based on a determination that the determined inclination 134 is greater than or equal to a threshold angle (e.g., ~40 degrees).

In one or more embodiments, the circuitry 106 may detect the one or more wheels 114 of the electric cycle 104 to be in contact with a surface 146 of the inclined structure 116. Thereafter, the circuitry 106 may control the electronically-actuated driving mechanism 108 to drive the one or more wheels 114 that may be detected to be in contact with the surface 146 of the inclined structure 116. For example, as the user 118 may lift up and push the electric cycle 104 up on a staircase (i.e. the inclined structure 116), the rear wheel 126b may be in contact with a portion of the staircase. The movement of the rear wheel 126b may reduce a force needed to push the electric cycle 104 up on the staircase. In some instances, the user 118 may merely need to hold the handlebar 124 of the electric cycle 104 to balance the electric cycle 104 on the staircase and prevent the electric cycle 104 from falling backwards. Similarly, as the user 118 may lift up and carry the electric cycle 104 down the staircase, the front wheel 126a and/or the rear wheel 126b may be in contact with a portion of the staircase. In such a case, the movement of the front wheel 126a and/or the rear wheel 126b may be controlled (e.g., using the electronically-actuated braking mechanism 132) to allow the user 118 to comfortably carry the electric cycle 104 down the staircase.

At any time-instant, when the electric cycle 104 is on the inclined structure 116, the user 118 may be able to actuate the input device 142. The circuitry 106 may be configured to receive a trigger input through the input device 142. The circuitry 106 may further control the electronically-actuated driving mechanism 108 based on the received trigger input to drive the one or more wheels 114 of the electric cycle 104. Additionally, or alternatively, after the trigger input is received, the circuitry 106 may again determine whether the seat 112 is vacant and whether the inclination 134 of the electric cycle 104 is greater than or equal to the threshold angle. Based on such determination, the circuitry 106 may configure the electronically-actuated driving mechanism 108 to drive the one or more wheels 114 on the inclined structure 116. For example, based on the trigger input from the input device 142, a speed of rotation of the one or more wheels 114 of the electric cycle 104 may be controlled. In some instances, if it is determined that the one or more wheels 114 are already in motion on the inclined structure 116, then the trigger input may cause the circuitry 106 to limit, slow down, or stop the movement of the one or more wheels 114. For example, if the user 118 presses the button on the input device 142 and holds the button in a pressed state for a period, such as 3 to 4 seconds, then the duration of the trigger input may be analyzed to determine whether to limit, slow down, or stop the movement of the one or more wheels 114.

An exemplary scenario for a control of wheel torque using the electronically-actuated gear mechanism 130 is described herein. The electronically-actuated gear mechanism 130 may enable the electric cycle 104 to control the wheel torque on the front wheel 126a and/or the rear wheel 126b of the electric cycle 104. For example, as the electric cycle 104 may move up on the inclined structure 116, the circuitry 106 may control the electronically-actuated gear mechanism 130 to control the wheel torque associated with the one or more wheels 114 of the electric cycle 104. This control may be performed to reduce the user's effort in pushing the electric cycle 104 up on the inclined structure 116 at different height levels. For example, after moving the electric cycle 104 up to 2 stories of a staircase, the user 118 may feel tired and the electric cycle 104 may feel heavier at increased height levels. Therefore, the electronically-actuated gear mechanism 130 may switch gears to transfer more wheel torque on the one or more wheels 114 of the electric cycle 104.

Another exemplary scenario for a control of rotation speed using the electronically-actuated braking mechanism 132 is described herein. The electronically-actuated braking mechanism 132 may enable the electric cycle 104 to control the rotation speed of the one or more wheels 114 of the electric cycle 104. For example, as the electric cycle 104 may move down the inclined structure 116, the circuitry 106 may control the electronically-actuated braking mechanism 132 to control the rotation speed of the one or more wheels 114 of the electric cycle 104. For example, after moving the electric cycle 104 down from 3 stories to 2 stories of a staircase, the user 118 may want to stop to take a rest before moving down by 2 more stories. Alternatively, the user 118 may want to limit the movement of the wheels to avoid undesired acceleration which may cause the user 118 to lose his/her balance on the staircase. Therefore, this control may be performed to reduce the user's effort in moving the electric cycle 104 down the inclined structure 116.

An exemplary embodiment for a controlled movement of the electric cycle 104 is provided herein for user's safety. Typically, the effort needed to push up the electric cycle 104 on the inclined structure 116 varies depending on age, medical condition(s), or a lifestyle of the user 118. Based on the received sensor information, the circuitry 106 may detect a user discomfort level associated with a movement of the electric cycle 104 on the inclined structure 116. For example, the sensor information may include datapoints associated with an unstable movement of the electric cycle 104 on the inclined structure 116. The unstable movement may be, for example, a result of a poor grip on the frame 122 or the handlebar 124, a medical condition (e.g., increased blood pressure), or an unintended loss of balance on the inclined structure 116. In such instances, the circuitry 106 may further control the electronically-actuated driving mechanism 108 based on the detection of the user discomfort level to adjust the rotation speed of the one or more wheels 114 so as to mitigate a cause of the detected user discomfort level.

It should be noted that the functions and/or operations performed by the circuitry 106 (as described in FIG. 1 and FIG. 2) of the system 102 may also be performed by circuitry (as shown in FIG. 3) of the electric cycle 104, without a deviation from the scope of the disclosure.

FIG. 2 is a block diagram of the exemplary system of FIG. 1, in accordance with an embodiment of the disclosure. FIG. 2 is explained in conjunction with elements from FIG. 1.

With reference to FIG. 2, there is shown a block diagram 200 of the system 102. The system 102 may include the circuitry 106, the memory 202, and a network interface 204. Additionally, in some embodiments, the system 102 may also include the sensor system 110 which may be configured to acquire the inclination information and the occupancy information associated with the electric cycle 104. There is further shown a communication network 206 which may be established among the system 102 and different components, such as the electronically-actuated driving mechanism 108, the sensor system 110, and the input device 142.

The memory 202 may include suitable logic, circuitry, and interfaces that may be configured to store the program instructions which may be executable by the circuitry 106. Examples of the implementation of the memory 202 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card. In at least one embodiment, the memory 202 may be configured to store the sensor information acquired from the sensor system 110 of the electric cycle 104 and other information, such as the inclination-reference 136, the threshold angle, and the user discomfort level.

The network interface 204 may include suitable logic, circuitry, and interfaces that may be configured to facilitate a communication between the circuitry 106, the electronically-actuated driving mechanism 108, the sensor system 110, and the input device 142, via the communication network 206. The network interface 204 may be implemented by use of various known technologies to support wired or wireless communication of the system 102 and different electronic components of the electric cycle 104 via the communication network 206. The network interface 204 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 204 may be configured to communicate via wireless communication with networks, such as the Internet, an Intranet or a wireless network, such as a cellular telephone network, a wireless local area network (LAN), and a metropolitan area network (MAN). The wireless communication may use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The communication network 206 may include a communication medium through which the system 102, the electronically-actuated driving mechanism 108, the sensor system 110, and the input device 142 may communicate with each other. The communication network 206 may be one of a wired connection or a wireless connection. Examples of the communication network 206 may include, but are not limited to, the Internet, a cloud network, a Wireless Fidelity (Wi-Fi) network, a Personal Area Network (PAN), a Local Area Network (LAN), or a Metropolitan Area Network (MAN).

Components of the system 102 and of the electric cycle 104 may be configured to connect to the communication network 206 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

FIG. 3 is a block diagram of the exemplary electric cycle of FIG. 1, in accordance with an embodiment of the disclosure. FIG. 3 is explained in conjunction with elements from FIG. 1 and FIG. 2. With reference to FIG. 3, there is shown a block diagram 300 of the electric cycle 104. The electric cycle 104 may include circuitry 302, a memory 304, and a network interface 306. The electric cycle 104 may further include the electronically-actuated driving mechanism 108 and the sensor system 110. The electronically-actuated driving mechanism 108 may include, for example, the electronically-actuated gear mechanism 130 and the electronically-actuated braking mechanism 132. The sensor system 110 may include the leveler 138 and the load sensor 140. The leveler 138 may be configured to acquire the inclination information associated with the electric cycle 104 and the load sensor 140 may be configured to acquire the occupancy information associated with the electric cycle 104. In at least one embodiment, the electric cycle may also include the input device 142 which may enable the user 118 to control a speed of the electric cycle 104 on the inclined structure 116.

The circuitry 302 may include suitable logic, circuitry, and/or interfaces that may be configured to execute program instructions associated with different operations of the electric cycle 104. The circuitry 302 may include any suitable special-purpose or general-purpose computer, computing entity, or processing device including various computer hardware or software modules and may be configured to execute the program instructions stored on any applicable computer-readable storage media. For example, the circuitry 302 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single circuitry in FIG. 2, the circuitry 302 may include any number of processors configured to, individually or collectively, perform or direct performance of any number of operations of the electric cycle 104, as described in the present disclosure. In some embodiments, the circuitry 302 may be configured to interpret and/or execute program instructions and/or process data stored in the memory 304 and/or a persistent data storage. In some embodiments, the circuitry 302 may fetch program instructions from a persistent data storage and load the program instructions in the memory 304. After the program instructions are loaded into the memory 304, the circuitry 302 may execute the program instructions. Some of the examples of the circuitry 302 may be a Central Processing Unit (CPU), a Reduced Instruction Set Computer (RISC)

processor, an Application-Specific Integrated Circuit (ASIC) processor, a Complex Instruction Set Computer (CISC) processor, a co-processor, a Graphical Processing Unit (GPU), and/or a combination thereof.

The memory 304 may include suitable logic, circuitry, interfaces, and/or code that may be configured to store the program instructions executable by the circuitry 302. In certain embodiments, the memory 304 may be configured to store operating systems and associated application-specific information. The memory 304 may include computer-readable storage media for carrying or having computer-executable instructions or data structures stored thereon. Such computer-readable storage media may include any available media that may be accessed by a general-purpose or a special-purpose computer, such as the circuitry 302. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the circuitry 302 to perform a certain operation or a group of operations associated with the electric cycle 104.

The network interface 306 may include suitable logic, circuitry, and interfaces that may be configured to facilitate a communication between the circuitry 302, the electronically-actuated driving mechanism 108, the sensor system 110, and the input device 142. The network interface 306 may be implemented by use of various known technologies to support wired or wireless communication of the circuitry 302 with different electronic components of the electric cycle 104. The network interface 306 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 306 may be configured to communicate via wireless communication with networks, such as the Internet, an Intranet or a wireless network, such as a cellular telephone network, a wireless local area network (LAN), and a metropolitan area network (MAN). The wireless communication may use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

It should be noted here that the functions and/or operations performed by the circuitry 106 (as described in FIG. 1 and FIG. 2) may also be performed by the circuitry 302, without a deviation from the scope of the disclosure.

Figure 4:
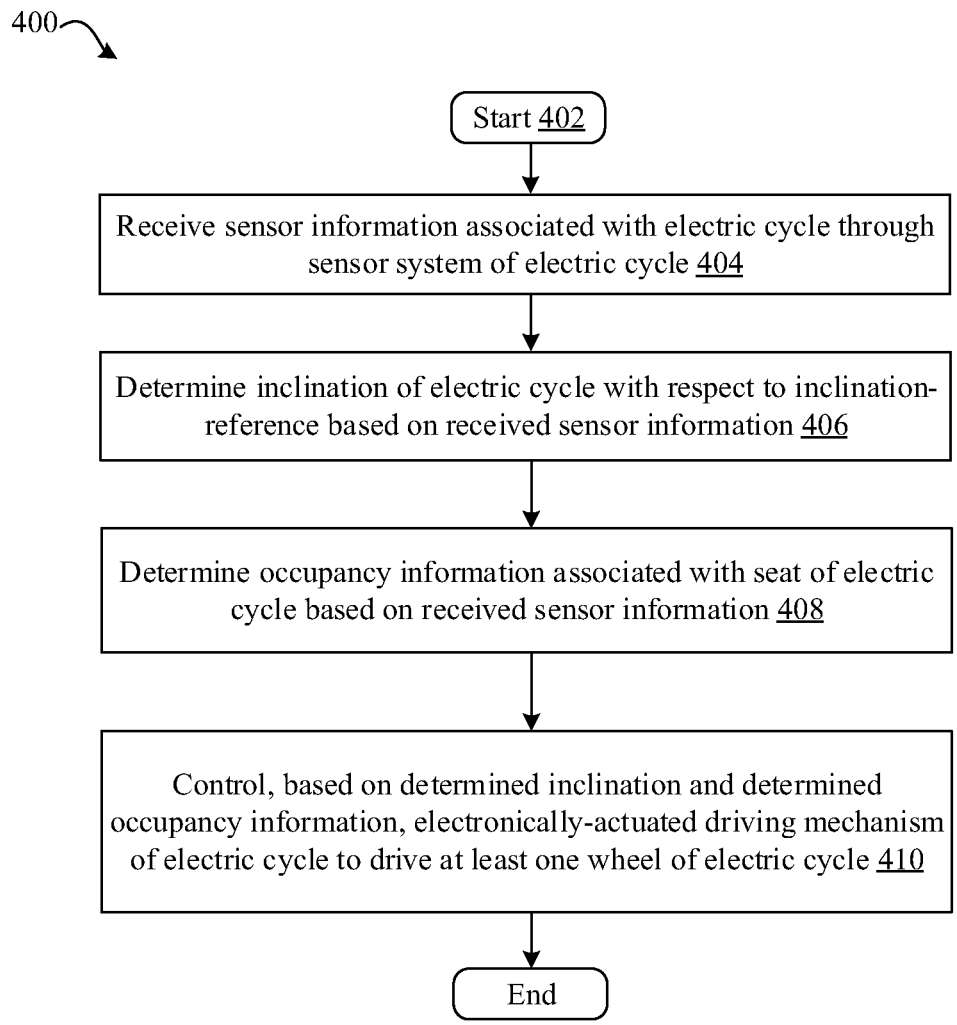
FIG. 4 is a flowchart of an exemplary method for providing a movement assistance to the electric cycle of FIG. 1 on an inclined structure, in accordance with an embodiment of the disclosure.

FIG. 4 is a flowchart of an exemplary method for providing a movement assistance to the electric cycle of FIG. 1, in accordance with an embodiment of the disclosure. FIG. 4 is explained in conjunction with elements from FIG. 1, 2, or 3. With reference to FIG. 4, there is shown a flowchart 400 that depicts a method for providing a movement assistance to the electric cycle 104 of FIG. 1. The method illustrated in the flowchart 400 may be performed by any suitably computing system, such as by the circuitry 106 of the system 102 or the circuitry 302 of the electric cycle 104. The method may start at 402 and may proceed to 404.

At 404, the sensor information associated with the electric cycle 104 may be received. In an embodiment, the circuitry 106 (or the circuitry 302) may be configured to receive the sensor information via the sensor system 110 of the electric cycle 104.

At 406, the inclination 134 of the electric cycle may be determined with respect to the inclination-reference 136 based on the received sensor information. In an embodiment, the circuitry 106 (or the circuitry 302) may be configured to determine the inclination of the electric cycle 104 with respect to the inclination-reference 136.

At 408, the occupancy information associated with the seat 112 of the electric cycle 104 may be determined based on the received sensor information. In an embodiment, the circuitry 106 (or the circuitry 302) may be configured to determine the occupancy information associated with the seat 112 of the electric cycle 104 based on the received sensor information.

At 410, based on the determined inclination and the determined occupancy information, the electronically-actuated driving mechanism 108 may be controlled to drive the one or more wheels 114 of the electric cycle 104. In an embodiment, the circuitry 106 (or the circuitry 302) may be configured to control the electronically-actuated driving mechanism 108 to drive the one or more wheels 114 of the electric cycle 104. Control may pass to end.

The flowchart 400 is illustrated as discrete operations, such as 402, 404, 406, 408, and 410. However, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer readable medium and/or storage medium having stored thereon, instructions executable by a machine and/or a computer to operate a system for providing a movement assistance to an electric cycle on an inclined structure. The instructions may cause the machine and/or computer to perform operations that include receiving sensor information associated with an electric cycle through a sensor system of the electric cycle and determining an inclination of the electric cycle with respect to an inclination-reference based on the received sensor information. The operations may further include determining occupancy information associated with a seat of the electric cycle based on the received sensor information and controlling, based on the determined inclination and the determined occupancy information, an electronically-actuated driving mechanism of the electric cycle so as to drive at least one wheel of the electric cycle.

For the purposes of the present disclosure, expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural. Further, all joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

The foregoing description of embodiments and examples has been presented for purposes of illustration and description. It is not intended to be exhaustive or limiting to the forms described. Numerous modifications are possible considering the above teachings. Some of those modifications have been discussed and others will be understood by those skilled in the art. The embodiments were chosen and described for illustration of various embodiments. The scope is, of course, not limited to the examples or embodiments set forth herein but can be employed in any number of applications and equivalent devices by those of ordinary skill in the art. Rather it is hereby intended the scope be defined by the claims appended hereto. Additionally, the features of various implementing embodiments may be combined to form further embodiments.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. A system, comprising:
   circuitry communicatively coupled to an electronically-actuated driving mechanism, a sensor system of an electric cycle, and an input device coupled to a frame of the electric cycle, wherein the circuitry is configured to:
   receive sensor information associated with the electric cycle through the sensor system;
   determine an inclination of the electric cycle with respect to an inclination-reference based on the received sensor information;
   determine occupancy information associated with a seat of the electric cycle based on the received sensor information;
   receive a trigger input through the input device coupled to the frame of the electric cycle; and
   control, based on the determined inclination, the determined occupancy information, and the received trigger input, the electronically-actuated driving mechanism to drive at least one wheel of the electric cycle.

2. The system according to claim 1, further comprising the sensor system configured to:
   acquire the sensor information associated with the electric cycle; and
   share the acquired sensor information with the circuitry.

3. The system according to claim 1, wherein the sensor system comprises a leveler mounted on a frame of the electric cycle, and wherein
   the leveler is configured to acquire inclination information associated with the electric cycle; and
   the circuitry is configured to receive the acquired inclination information as part of the sensor information associated with the electric cycle.

4. The system according to claim 1, wherein the sensor system further comprises a load sensor configured to be attached to the seat of the electric cycle, and wherein
   the load sensor is configured to acquire occupancy information associated with the electric cycle; and
   the circuitry is configured to receive the acquired occupancy information as part of the sensor information associated with the electric cycle.

5. The system according to claim 1, wherein the circuitry is further configured to control the electronically-actuated driving mechanism to drive the at least one wheel further based on a determination that the determined occupancy information indicates that the seat is vacant.

6. The system according to claim 1, wherein the determined inclination corresponds to an angle between the inclination-reference and one of a front wheel or a rear wheel of the electric cycle.

7. The system according to claim 1, wherein the control of the electronically-actuated driving mechanism corresponds to a control of a speed of rotation of the at least one wheel on an inclined structure.

8. The system according to claim 1, wherein the electronically-actuated driving mechanism comprises an electronically-actuated gear mechanism, and
   wherein, as the electric cycle moves up on an inclined structure, the circuitry is configured to control the electronically-actuated gear mechanism to control a wheel torque associated with the at least one wheel.

9. The system according to claim 1, wherein the electronically-actuated driving mechanism comprises an electronically-actuated braking mechanism, and wherein, as the electric cycle moves down on an inclined structure, the circuitry is configured to control the electronically-actuated braking mechanism to control a rotation speed of the at least one wheel.

10. The system according to claim 1, wherein the circuitry is configured to:
    detect, based on the received sensor information, a user discomfort level associated with a movement of the electric cycle on an inclined structure; and
    control, based on the detection of the user discomfort level, the electronically-actuated driving mechanism to adjust a rotation speed of the at least one wheel of the electric cycle so as to mitigate a cause of the detected user discomfort level.

11. The system according to claim 1, wherein the circuitry is further configured to:
    detect the at least one wheel of the electric cycle to be in contact with a surface of an inclined structure; and
    control the electronically-actuated driving mechanism to drive the at least one wheel which is detected to be in contact with the surface of the inclined structure.

12. The system according to claim 1, wherein the circuitry is further configured to control the electronically-actuated driving mechanism to drive the at least one wheel further based on a determination that the determined inclination is greater than or equal to a threshold angle.

13. An electric cycle, comprising:
    an electronically-actuated driving mechanism;
    a sensor system;
    an input device coupled to a frame of the electric cycle;
    circuitry communicatively coupled to the electronically-actuated driving mechanism, the sensor system, and the input device coupled to the frame of the electric cycle, wherein the circuitry is configured to:
        receive sensor information associated with the electric cycle through the sensor system;
        determine an inclination of the electric cycle with respect to an inclination-reference based on the received sensor information;
        determine occupancy information associated with a seat of the electric cycle based on the received sensor information;
        receive a trigger input through the input device coupled to the frame of the electric cycle; and
        control, based on the determined inclination, the determined occupancy information, and the received trigger input, the electronically-actuated driving mechanism to drive at least one wheel of the electric cycle.

14. The electric cycle according to claim 13, wherein the sensor system comprises a leveler mounted on a frame of the electric cycle, and wherein
    the leveler is configured to acquire inclination information associated with the electric cycle; and
    the circuitry is configured to receive the acquired inclination information as part of the sensor information associated with the electric cycle.

15. The electric cycle according to claim 13, wherein the sensor system further comprises a load sensor configured to be attached to the seat of the electric cycle, and wherein
    the load sensor is configured to acquire occupancy information associated with the electric cycle; and
    the circuitry is configured to receive the acquired occupancy information as part of the sensor information associated with the electric cycle.

16. The electric cycle according to claim 13, wherein the circuitry is further configured to control the electronically-actuated driving mechanism to drive the at least one wheel further based on a determination that the determined occupancy information indicates that the seat is vacant.

17. The electric cycle according to claim 13, wherein the electronically-actuated driving mechanism comprises an electronically-actuated gear mechanism, and
    wherein, as the electric cycle moves up on an inclined structure, the circuitry is configured to control the electronically-actuated gear mechanism to control a wheel torque associated with the at least one wheel.

18. A method, comprising:
    receiving sensor information associated with an electric cycle through a sensor system of the electric cycle;
    determining an inclination of the electric cycle with respect to an inclination-reference based on the received sensor information;
    determining occupancy information associated with a seat of the electric cycle based on the received sensor information;
    receiving a trigger input through an input device coupled to a frame of the electric cycle; and
    controlling, based on the determined inclination, the determined occupancy information, and the received trigger input, an electronically-actuated driving mechanism of the electric cycle to drive at least one wheel of the electric cycle.

* * * * *